(12) United States Patent

Simonetti et al.

(10) Patent No.: US 12,687,166 B2

(45) Date of Patent: Jul. 21, 2026

(54) AUTOMOTIVE ELECTRIC OIL PUMP

(71) Applicant: PIERBURG PUMP TECHNOLOGY GMBH, Neuss (DE)

(72) Inventors: Gianluca Simonetti, Neuss (DE); Vlad-Dumitru Vezentan, Neuss (DE); Alessandro Malvasi, Neuss (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 0 days.

(21) Appl. No.: 18/869,852

(22) PCT Filed: Jun. 2, 2022

(86) PCT No.: PCT/EP2022/065105

§ 371 (c)(1),
(2) Date: Nov. 27, 2024

(87) PCT Pub. No.: WO2023/232258

PCT Pub. Date: Dec. 7, 2023

(65) Prior Publication Data

US 2025/0369441 A1 Dec. 4, 2025

(51) Int. Cl.
*F04C 15/00* (2006.01)
*F04B 17/03* (2006.01)
(Continued)

(52) U.S. Cl.
CPC .......... *F04C 15/0096* (2013.01); *F04B 17/03* (2013.01); *F04B 49/065* (2013.01);
(Continued)

(58) Field of Classification Search
CPC .... F04C 15/0096; F04C 2/102; F04C 11/008;

F04C 15/008; F04C 2240/30; F04C 15/0088; F04C 2210/206; F04C 2240/808; F04C 15/06; F04C 2240/40; F04C 2/10; F04C 2270/195; F04C 2/08; F04D 29/588;

(Continued)

(56) References Cited

U.S. PATENT DOCUMENTS

| | | | |
|---|---|---|---|
| 10,018,198 B2 | 7/2018 | Hoppach | |
| 2011/0070100 A1 | 3/2011 | McSweeney et al. | |

(Continued)

FOREIGN PATENT DOCUMENTS

| | | |
|---|---|---|
| DE | 10 2019 127 498 A1 | 10/2020 |
| EP | 3 054 160 A1 | 8/2016 |

*Primary Examiner* — Peter J Bertheaud

(74) *Attorney, Agent, or Firm* — Norman B. Thot

(57) ABSTRACT

An automotive electric oil pump includes a static pump housing, an electric drive motor, a rotatable pump wheel, and a control module. The static pump housing defines a pumping chamber and a motor chamber which are fluidically connected to each other. The electric drive motor is arranged within the motor chamber. The electric drive motor has a motor stator and a motor rotor. The motor stator has stator coils. The rotatable pump wheel pumps oil through the pumping chamber, wherein a partial volume of the oil within the pumping chamber thereby flows through the motor chamber. The control module energizes the stator coils in a cold-start phase if a temperature of the oil within the motor chamber is below a defined temperature value and inhibits a rotation of the motor rotor. The motor stator directly contacts the oil.

11 Claims, 1 Drawing Sheet

(51) Int. Cl.

| | |
|---|---|
| *F04B 49/06* | (2006.01) |
| *F04B 53/08* | (2006.01) |
| *F04C 2/08* | (2006.01) |
| *F04C 2/10* | (2006.01) |
| *F04C 11/00* | (2006.01) |
| *F04C 14/00* | (2006.01) |
| *F04C 15/06* | (2006.01) |
| *F04D 13/06* | (2006.01) |
| *F04D 15/00* | (2006.01) |
| *F04D 29/58* | (2006.01) |
| *H02K 7/14* | (2006.01) |
| *H02K 9/19* | (2006.01) |

(52) U.S. Cl.

CPC ............... *F04B 53/08* (2013.01); *F04C 2/10* (2013.01); *F04C 2/102* (2013.01); *F04C 11/008* (2013.01); *F04C 15/008* (2013.01); *F04C 15/0088* (2013.01); *F04C 15/06* (2013.01); *F04D 13/0646* (2013.01); *F04D 13/0653* (2013.01); *F04D 15/00* (2013.01); *F04D 29/5806* (2013.01); *F04D 29/5813* (2013.01); *F04D 29/588* (2013.01); *H02K 7/14* (2013.01); *H02K 9/19* (2013.01); *F04C 2/08* (2013.01); *F04C 14/00* (2013.01); *F04C 2210/206* (2013.01); *F04C 2240/30* (2013.01); *F04C 2240/40* (2013.01); *F04C 2240/808* (2013.01); *F04C 2270/195* (2013.01); *F04D 13/06* (2013.01)

(58) Field of Classification Search

CPC ............. F04D 13/0653; F04D 29/5806; F04D 29/5813; F04D 13/0646; F04D 15/00; F04D 13/06; H02K 9/19; H02K 7/14; F04B 49/065; F04B 53/08; F04B 17/03

See application file for complete search history.

(56) References Cited

U.S. PATENT DOCUMENTS

| | | | |
|---|---|---|---|
| 2016/0233814 A1* | 8/2016 | Okamoto ............ | F04C 15/0096 |
| 2019/0003477 A1* | 1/2019 | Graves .................. | H02K 11/25 |
| 2020/0309121 A1 | 10/2020 | Jang et al. | |
| 2021/0095649 A1 | 4/2021 | Furushou et al. | |

* cited by examiner

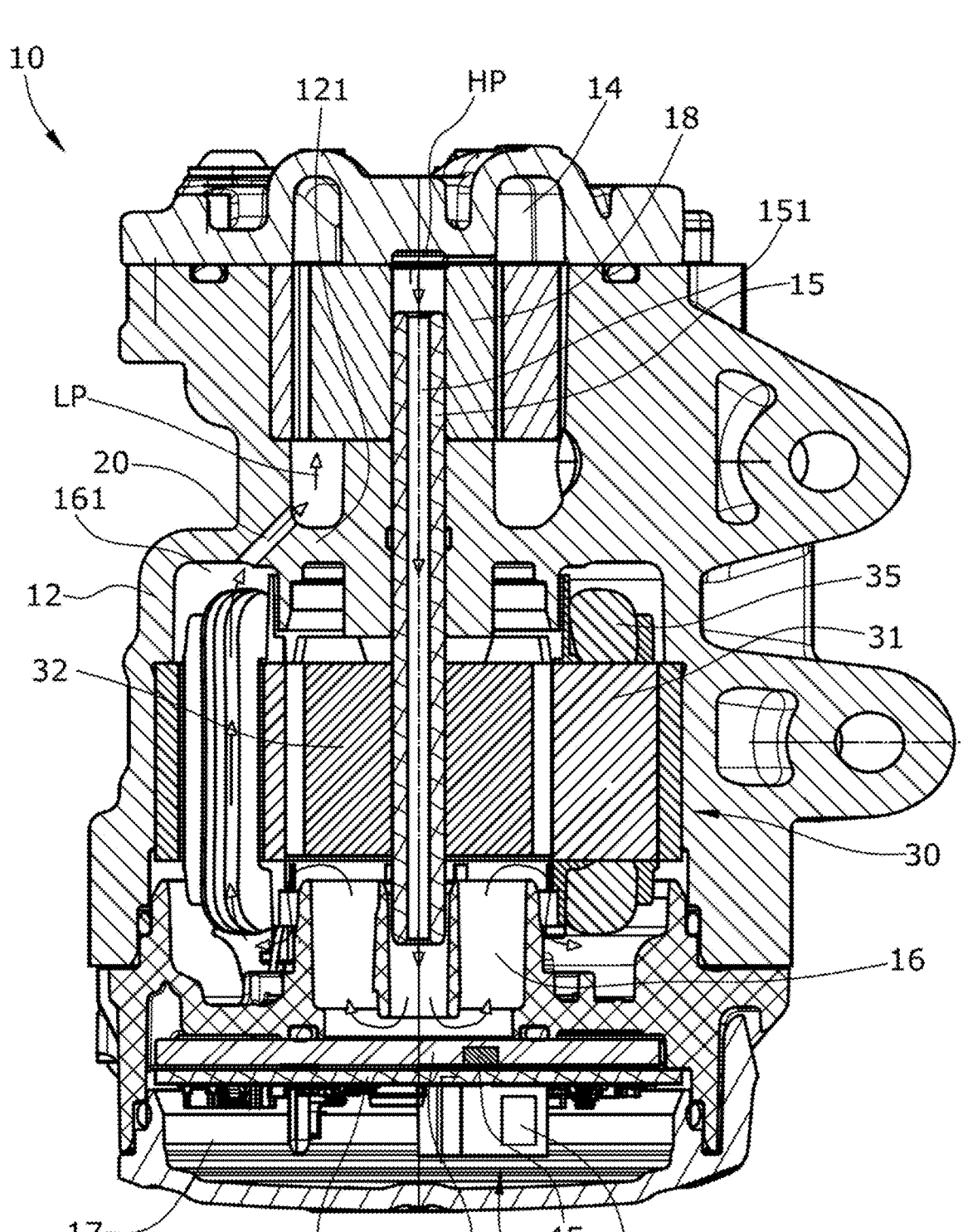

AUTOMOTIVE ELECTRIC OIL PUMP

CROSS REFERENCE TO PRIOR APPLICATIONS

This application is a U.S. National Phase application under 35 U.S.C. § 371 of International Application No. PCT/EP2022/065105, filed on Jun. 2, 2022. The International Application was published in English on Dec. 7, 2023 as WO 2023/232258 A1 under PCT Article 21(2).

FIELD

The present invention is directed to an automotive electric oil pump, in particular to an automotive electric oil pump with an improved cold-start behavior.

BACKGROUND

An automotive electric oil pump for supplying an oil circuit within a vehicle is typically driven by an electric drive motor which drives the pump rotor. An automotive electric oil pump is therefore suitable for all kinds of driven vehicles. The automotive electric oil pump is usually cooled by the pumped oil by guiding the oil into that part of the pump housing where the electric drive motor is arranged. This motor chamber is therefore flooded with oil so that at least the motor rotor of the electric drive motor is provided as a so-called wet rotor which is permanently surrounded by oil.

An automotive electric oil pump also has a relatively large operating temperature range of –40° C. to 150° C. At relatively low temperatures, in particular at temperatures below –10° C., the viscosity of the oil is relatively high so that the oil becomes semi-liquid. The high viscosity of the oil causes a relatively large viscous friction which prevents or impedes the rotation of the pump rotor when the pump is started so that only an overpowered electric drive motor generating a relatively large driving torque can rotate the pump rotor. The clearances between components that move relative to each other also decrease with sinking temperatures.

DE 10 2019 127 498 A1 and U.S. Pat. No. 10,018,198 B2 both describe an automotive electric oil pump which are driven by an electric drive motor. The motor chamber which houses the electric drive motor is fluidically connected to the pumping chamber so that oil from the pumping chamber enters the motor chamber and is heated by the waste heat of the operating electric drive motor.

The heating of the oil by using the waste heat of the electric drive motor requires an already running electric drive motor. At the start-up of the motor at low outdoor temperatures, the oil is nonetheless cold and therefore semi-fluid. The usage of waste heat only can shorten a cold-start phase if the pump rotor is already rotating, but has no effect if the pump has not yet started. The immediate rotation of the pump rotor can also cause damage at the pump rotor and in particular at the pump wheel if the oil is very cold.

SUMMARY

An aspect of the present invention is to provide an automotive electric oil pump with an improved cold-start behavior.

In an embodiment, the present invention provides an automotive electric oil pump which includes a static pump housing, an electric drive motor, a rotatable pump wheel, and a control module. The static pump housing defines a pumping chamber and a motor chamber. The pumping chamber and the motor chamber are fluidically connected to each other. The electric drive motor is arranged within the motor chamber. The electric drive motor comprises a motor stator and a motor rotor. The motor stator comprises a plurality of stator coils. The rotatable pump wheel is configured to pump oil through the pumping chamber, wherein a partial volume of the oil within the pumping chamber thereby flows through the motor chamber. The control module is configured to energize the plurality of stator coils in a cold-start phase if a temperature of the oil within the motor chamber is below a defined temperature value and to inhibit a rotation of the motor rotor. The motor stator is in a direct contact with the oil.

BRIEF DESCRIPTION OF THE DRAWINGS

The present invention is described in greater detail below on the basis of embodiments and of the drawing in which:

The FIGURE shows an automotive electric oil pump according to the present invention in a schematic longitudinal cross-sectional view.

DETAILED DESCRIPTION

An automotive electric oil pump according to the present invention comprises a static pump housing which defines a pumping chamber and a motor chamber, wherein the pumping chamber and the motor chamber are fluidically connected to each other. The pump housing can be one single one-piece component or a multi-piece component. The pumping chamber and the motor chamber can, for example, be arranged axially adjacent to each other.

The automotive electric oil pump further comprises an electric drive motor with a motor stator and a motor rotor. The electric drive motor is arranged within the motor chamber of the pump housing. The motor stator comprises several stator coils which are energized during a normal operation mode of the electric drive motor so that the motor rotor rotates.

The automotive electric oil pump comprises a rotatable pump wheel which is arranged within a pumping chamber of the automotive electric oil pump. The pump wheel is co-rotatably connected to the motor rotor for rotating the pump wheel within the pumping chamber. In a normal operation mode, oil is therefore pumped through the pumping chamber, for example, into a connected oil circuit of a vehicle. Due to the fluidic connection between the pumping chamber and the motor chamber, a partial volume of the oil which is pumped through the pumping chamber flows into the motor chamber and through the motor chamber during the normal operation mode. The partial volume flow can, for example, be fluidically parallel to the volume flow which is pumped through the pumping chamber. The motor chamber is accordingly permanently flooded with oil. The oil remains within the motor chamber as well as within the pumping chamber if the automotive electric oil pump is stopped. The viscosity of the oil within the motor chamber increases as outdoor temperatures decrease. At relatively low ambient temperatures, in particular at temperatures below –10° C., the viscosity of the oil is relatively high resulting in a relatively semi-liquid oil that surrounds the electric drive motor.

The automotive electric oil pump comprises a control module which is configured to energize the stator coils in a cold-start phase at relatively low outdoor temperatures. The automotive electric oil pump is started in a cold-start mode at such low outdoor temperatures. In the cold-start mode, if the temperature of the oil is below a defined temperature value, the control module energizes the stator coils with an energizing pattern to inhibit the rotation of the motor rotor. The stator coils are accordingly energized, wherein the rotation of the motor rotor is intentionally inhibited.

As a result of energizing the stator coils, the stator coils generate heat which is used to heat the oil surrounding the electric drive motor within the motor chamber. The cold-start mode thereby provides a static heating function of the electric drive motor. The motor stator is in direct contact with the oil so that a direct convective heat transfer from the energized and heated stator coils to the surrounding oil is provided. The oil is thereby heated relatively quickly resulting in a decreasing viscosity of the oil so that the oil becomes more and more liquid. The viscous friction between the oil and the motor rotor is thus reduced so that the automotive electric oil pump can be started with a relatively low driving torque despite relatively low outdoor temperatures.

The application of the cold-start mode allows for the use of a smaller electric drive motor with a lower performance compared to a conventional electric oil pump, thereby reducing a total size of the automotive electric oil pump according to the present invention. The start-up phase can also be shortened and the operating temperature range of the pump extended.

In an embodiment of the present invention, the motor chamber can, for example, be fluidically connected to the pumping chamber via an internal connection channel within the pump housing. The connection channel can, for example, extend through a separating wall between the pumping chamber and the motor chamber. A relatively short and direct fluidic connection between the pumping chamber and the motor chamber is thereby provided which allows for a continuous internal oil flow between the pumping chamber and the motor chamber.

In an embodiment of the present invention, the motor chamber can, for example, comprise a stator section which can, for example, be arranged at the radial outside of the motor chamber. The motor stator which is arranged within the stator section accordingly circumferentially surrounds the motor rotor of the electric drive motor. The internal connection channel can, for example, extend between the pumping chamber and the stator section. The fluidic connection between the pumping chamber and the stator section provides that oil flows along the motor stator, and in particular along the wires of the stator coils, which is in particular advantageous for cooling the motor stator if the automotive electric oil pump is in the normal operating mode. The bypassing oil thereby dissipates the heat being generated by the motor stator during operation of the automotive electric oil pump.

In an embodiment of the present invention, the motor stator can, for example, additionally contact the pump housing of the automotive electric oil pump in order to directly heat the pump housing. If the automotive electric oil pump is, for example, arranged within an oil reservoir as a type of submersible pump, the heating of the pump housing additionally allows the oil surrounding the oil pump within the oil reservoir to be heated.

In an embodiment of the present invention, the automotive electric oil pump can, for example, comprise a hollow drive shaft. The hollow drive shaft co-rotatably connects the pump wheel and the motor rotor of the electric drive motor so that the hollow drive shaft can, for example, extend from the pumping chamber to the motor chamber. The hollow drive shaft comprises an internal channel which extends completely through the hollow drive shaft in an axial direction. The internal shaft channel thereby fluidically connects the pumping chamber and the motor chamber of the automotive electric oil pump. The internal shaft channel accordingly allows oil to flow from the pumping chamber into the motor chamber or vice versa. If the hollow drive shaft is used in combination with the internal connection channel within the pump housing, a closed oil circuit is defined within the pump housing which provides that oil can flow, for example, from the pumping chamber through the hollow drive shaft into the motor chamber and through the internal connection channel back into the pumping chamber. The oil can alternatively flow in the opposite direction from the pumping chamber through the internal connection channel into the motor chamber and back to the pumping chamber through the hollow drive shaft.

In an embodiment of the present invention, the automotive electric oil pump can, for example, comprise a temperature sensor which allows the oil temperature within the pump housing to be measured. By measuring the exact oil temperature within the motor chamber, the heating period during the cold-start mode can be determined precisely and the normal operating mode started as soon as possible, thereby avoiding an overheating of the oil and, for example, of the motor stator in the cold-start mode.

In an embodiment of the present invention, the automotive electric oil pump can, for example, comprise a printed circuit board. The printed circuit board comprises several power electronic components for driving the electric drive motor of the automotive electric pump. The printed circuit board can, for example, be arranged within a separate electronics chamber within the pump housing. A heat transfer wall can, for example, fluidically separate the electronics chamber from the motor chamber. The printed circuit board can, for example, be arranged axially adjacent to and in an inner heat transferring contact with the heat transfer wall. The printed circuit board can, for example, be arranged directly on and in an inner heat transferring contact with the heat transfer wall. The separate electronics chamber is fluidically separated from the pumping chamber and/or the motor chamber so that the liquid-sensitive power electronic components are not contacted by any oil within the pump housing. The electronics chamber can, for example, be arranged axially adjacent to the motor chamber so that the oil flowing through the motor chamber dissipates heat which is generated by the power electronic components. The temperature sensor can, for example, be embedded within the heat transfer wall and directly contact the printed circuit board.

An embodiment of the present invention is described below with reference to the enclosed drawing.

The FIGURE shows an automotive electric gerotor oil pump 10 for a motor vehicle, the automotive electric gerotor oil pump 10 comprising a static pump housing 12 which defines a pumping chamber 14 at one axial end of the pump housing 12. The pump housing 12 further defines a motor chamber 16 which is arranged axially adjacent to the pumping chamber 14. The automotive electric gear motor oil pump 10 further comprises an electric drive motor 30 with a motor stator 31 and the motor rotor 32. The electric drive motor 30 is arranged within the motor chamber 16 of the pump housing 12. The motor chamber 16 comprises an outer stator section 161 in which the motor stator 31 is arranged. The motor stator 31 accordingly radially surrounds the motor rotor 32. The motor stator 31 is in direct contact with the pump housing 12 at its radial outside. The motor stator 31 comprises several stator coils 35 which are arranged equiangularly over the circumference of the motor stator 31.

The automotive electric gerotor oil pump 10 further comprises an electronics chamber 17 which is arranged axially adjacent to the motor chamber 16 opposite to the pumping chamber 14. A printed circuit board 50 is arranged within the electronics chamber 17, the printed circuit board 50 comprising several power electronic components 51 for driving the electric drive motor 30. The printed circuit board 50 is arranged axially adjacent and in inner heat transferring contact with a heat transfer wall 55 which fluidically separates the electronics chamber 17 from the axially adjacent motor chamber 16. The FIGURE shows that the printed circuit board 50 is arranged directly on and in an inner heat transferring contact with the heat transfer wall 55.

The automotive electric gerotor oil pump 10 comprises a rotatable pump wheel 18 which is arranged within the pumping chamber 14. The pump wheel 18 is co-rotatably connected to the motor rotor 32 via a hollow drive shaft 15. During a normal operation mode, the stator coils 35 of the motor stator 31 are energized to thereby electromagnetically drive the motor rotor 32, thereby rotating the pump wheel 18 within the pumping chamber 14 for pumping oil through the pumping chamber 14 and through a fluidically connected oil circuit of the motor vehicle.

The motor chamber 16 is fluidically connected to the pumping chamber 14 via an internal substantially cylindrical connection channel 20 within the pump housing 12, the connection channel 20 extending through a separating wall 121 between the pumping chamber 14 and the motor chamber 16. The motor chamber 16 and the pumping chamber 14 are thereby both fluidically connected via the connection channel 20 and via a shaft channel 151 within the hollow drive shaft 15 which extends from the center of the pumping chamber 14 through the electric drive motor 30 into the motor chamber 16. The hollow drive shaft 15 is thereby fluidically connected to a high-pressure zone HP of the pumping chamber 14, whereas the connection channel 20 is fluidically connected to a low-pressure zone LP of the pumping chamber 14. A pressure difference is thereby provided which forces oil to flow from the pumping chamber 14 through the shaft channel 151 to that axial side of the motor chamber 16 which is remote to the pumping chamber 14.

The hollow drive shaft 15 guides the oil from the pumping chamber 14 through the motor rotor 32 to the heat transfer wall 55 at the electronics chamber 17. At the heat transfer wall 55, the oil flows radially outwards and is re-directed into the opposite direction towards the electric drive motor 30. The oil thereby absorbs heat from the heat transfer wall 55 which is generated by the power electric components 51 at the printed circuit board 50 during the operation of the electric drive motor 30 in the normal operation mode of the automotive electric gerotor oil pump 10. At the electric drive motor 30, the oil flows substantially radially outwards towards the stator section 161 and flows in an axial direction through the free spaces between the stator coils 35 of the motor stator 31, which is here star-shaped, towards the separating wall 121 between the motor chamber 16 and the pumping chamber 14. The oil thereby dissipates the heat which is generated by the motor stator 31. The oil flows from the stator section 161 through the connection channel 20 back into the low-pressure zone LP of the pumping chamber 14.

The automotive electric gerotor oil pump 10 further comprises a control module 40 which is configured to energize the stator coils 35 in a cold-start phase if the outdoor temperatures are extremely low, for example, below −10° C. At such low outdoor temperatures, if the pump did not run for a longer period, the temperature of the oil within the motor chamber 16 is substantially at a relatively low level so that the viscosity of the oil is relatively high resulting in an extreme semi-liquid condition of the oil. A cold-start mode is initiated to reduce the viscosity of the oil if the temperature of the oil is below a defined temperature value before the automotive electric gerotor oil pump 10 is started in the normal operation mode. The temperature of the oil within the motor chamber 16 is measured by a temperature sensor 45 which is arranged at the printed circuit board 50 within the electronics chamber 17. The temperature sensor 45 is in particular arranged in a direct heat-transferring contact with the heat transfer wall 55 to provide a reliable measuring of the oil temperature within the adjacent motor chamber 16. The FIGURE shows that temperature sensor 45 is embedded within the heat transfer wall 55 and in a direct contact with the printed circuit board 50.

In the cold-start mode, the stator coils 35 are energized to heat up the oil, but are energized so that the motor rotor 31 is not rotated. The stator coils 35 can, for example, be energized without a commutation of the magnetic field so that only a static magnetic field is generated by the motor stator 31 which does not allow for a rotation of the motor rotor 32. The heat being generated by the stator coils 35 is transferred to the oil, and the rising temperature of the oil reduces the viscosity thereof so that the oil becomes relatively liquid. The viscous friction between the oil and the motor rotor 32 is thereby significantly reduced and allows the rotation of the motor rotor 32 to start using a relatively low driving torque. The heating time period thereby depends on the temperature of the oil within the motor chamber 16. The heating time period in the cold-start mode ends if the oil temperature rises above a defined temperature value, for example, is above 20° C.

Due to the direct contact between the motor stator 31 and the pump housing 12, the heat being generated by the motor stator 31 during the cold-start mode is additionally transferred to the pump housing 12. The heat is thereby transferred through the pump housing 12 to the pumping chamber 14 so that the oil within the pumping chamber 14 is also heated. If the automotive electric gerotor oil pump 10 is, for example, arranged within an oil reservoir as a type of submersible pump, the heating of the pump housing 12 would also allow for the additional heating of the oil within the oil reservoir.

The present invention is not limited to the described embodiment. The automotive electric gerotor oil pump 10 could also be defined by any other suitable pump type for pumping oil, for example, the automotive electric gerotor oil pump 10 could be a centrifugal pump, a vane pump, a pendulum-slider pump or a side-channel pump. The automotive electric gerotor oil pump 10 could also be integrated into an oil reservoir as a type of submersible pump but could alternatively be arranged outside of an oil reservoir. The automotive electric gerotor oil pump 10 is also suitable for different types of oil circuits within a vehicle, for example, for supplying an internal combustion engine or an auxiliary drive unit of an internal combustion engine, but also to supply any oil circuit of a hybrid or battery electric vehicle.

The present invention is not limited to embodiments described herein; reference should be had to the appended claims.

LIST OF REFERENCE NUMERALS

10 Automotive electric gerotor oil pump
12 Pump housing

14 Pumping chamber
15 Hollow drive shaft
16 Motor chamber
17 Electronics chamber
18 Pump wheel
20 Connection channel
30 Electric drive motor
31 Motor stator
32 Motor rotor
35 Stator coils
40 Control module
45 Temperature sensor
50 Printed circuit board
51 Power electronic components
55 Heat transfer wall
121 Separating wall
151 Shaft channel
161 Stator section
HP High-pressure zone
LP Low-pressure zone

What is claimed is:

1. An automotive electric oil pump comprising:
a static pump housing which defines a pumping chamber and a motor chamber, the pumping chamber and the motor chamber being fluidically connected to each other;
an electric drive motor which is arranged within the motor chamber, the electric drive motor comprising a motor stator and a motor rotor, the motor stator comprising a plurality of stator coils;
a rotatable pump wheel which is configured to pump oil through the pumping chamber, wherein a partial volume of the oil within the pumping chamber thereby flows through the motor chamber; and
a control module which is configured to energize the plurality of stator coils in a cold-start phase if a temperature of the oil within the motor chamber is below a defined temperature value and to inhibit a rotation of the motor rotor,
wherein,
the motor stator is in a direct contact with the oil.

2. The automotive electric oil pump as recited in claim 1, wherein,
the static pump housing comprises an internal connection channel arranged therein, and
the motor chamber is fluidically connected to the pumping chamber via the internal connection channel.

3. The automotive electric oil pump as recited in claim 2, wherein,
the motor chamber comprises a stator section, and
the internal connection channel is arranged to extend between the pumping chamber and the stator section.

4. The automotive electric oil pump as recited in claim 1, wherein the motor stator is in a direct contact with the static pump housing.

5. The automotive electric oil pump as recited in claim 1, further comprising:
a hollow drive shaft which is configured to fluidically connect the pumping chamber and the motor chamber.

6. The automotive electric oil pump as recited in claim 1, further comprising:
a temperature sensor which is configured to measure a temperature of the oil within the static pump housing.

7. The automotive electric oil pump as recited in claim 1, further comprising:
a printed circuit board comprising a plurality of power electronic components; and an electronics chamber which is arranged within the static pump housing,
wherein,
the printed circuit board is arranged within the electronics chamber.

8. An automotive electric oil pump comprising:
a static pump housing which defines a pumping chamber and a motor chamber, the pumping chamber and the motor chamber being fluidically connected to each other;
an electric drive motor which is arranged within the motor chamber, the electric drive motor comprising a motor stator and a motor rotor, the motor stator comprising a plurality of stator coils;
a rotatable pump wheel which is configured to pump oil through the pumping chamber, wherein a partial volume of the oil within the pumping chamber thereby flows through the motor chamber;
a control module which is configured to energize the plurality of stator coils in a cold-start phase if a temperature of the oil within the motor chamber is below a defined temperature value and to inhibit a rotation of the motor rotor;
a heat transfer wall which fluidically separates an electronics chamber from the motor chamber; and
a temperature sensor which is configured to measure a temperature of the oil within the static pump housing, the temperature sensor being arranged embedded within the heat transfer wall,
wherein,
the motor stator is in a direct contact with the oil.

9. An automotive electric oil pump comprising:
a static pump housing which defines a pumping chamber and a motor chamber, the pumping chamber and the motor chamber being fluidically connected to each other;
an electric drive motor which is arranged within the motor chamber, the electric drive motor comprising a motor stator and a motor rotor, the motor stator comprising a plurality of stator coils;
a rotatable pump wheel which is configured to pump oil through the pumping chamber, wherein a partial volume of the oil within the pumping chamber thereby flows through the motor chamber;
a control module which is configured to energize the plurality of stator coils in a cold-start phase if a temperature of the oil within the motor chamber is below a defined temperature value and to inhibit a rotation of the motor rotor;
an electronics chamber which is arranged within the static pump housing;
a heat transfer wall which fluidically separates the electronics chamber from the motor chamber; and
a printed circuit board comprising a plurality of power electronic components, the printed circuit board being arranged directly on and in an inner heat transferring contact with the heat transfer wall,
wherein,
the motor stator is in a direct contact with the oil.

10. The automotive electric oil pump as recited in claim 9, further comprising:
a temperature sensor which is configured to measure a temperature of the oil within the static pump housing, the temperature sensor being arranged embedded within the heat transfer wall.

11. The automotive electric oil pump as recited in claim 10, wherein the temperature sensor is further arranged to be in a direct contact with the printed circuit board.

* * * * *